United States Patent
Adams et al.

(10) Patent No.: US 7,904,320 B1
(45) Date of Patent: Mar. 8, 2011

(54) BUSINESS PROCESS FOR DEVELOPING ENTERPRISE STRATEGY

(75) Inventors: Thomas Mark Adams, Overland Park, KS (US); Carter Wayne Floyd, Jr., Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1168 days.

(21) Appl. No.: 11/553,354

(22) Filed: Oct. 26, 2006

(51) Int. Cl.
G06Q 10/00 (2006.01)
(52) U.S. Cl. .......................................... 705/7
(58) Field of Classification Search ....................... 705/7
See application file for complete search history.

(56) References Cited

U.S. PATENT DOCUMENTS

| | | | | |
|---|---|---|---|---|
| 7,729,934 | B1* | 6/2010 | Adams | 705/7 |
| 2003/0212584 | A1* | 11/2003 | Flores | 705/7 |
| 2004/0039619 | A1* | 2/2004 | Zarb | 705/7 |
| 2005/0043977 | A1* | 2/2005 | Ahern et al. | 705/7 |
| 2005/0137950 | A1* | 6/2005 | Palozzi et al. | 705/35 |
| 2005/0246215 | A1* | 11/2005 | Rackham | 705/7 |
| 2006/0085255 | A1* | 4/2006 | Hastings et al. | 705/14 |

OTHER PUBLICATIONS

Phaal et al., Developing a Technology Roadmapping System, In Technology Management: A Unifying Discipline for Melting the Boundaries. PICMET: Portland International Center for Management of Engineering and Technology, Anderson, T.R. Ed., Aug. 2005, p. 99-111.*
Phaal et al., Fast-Start Technology Roadmapping, Department of Engineering, University of Cambridge, 2003, p. 1-12.*
Phaal et al., Fast-Start Technology Roadmapping, UNIDO—Technology Foresight for Practitioners, Oct. 9, 2003, p. 1-59.*
Lee and Park, Customization of technology roadmaps according to roadmapping purposes: Overall process and detailed modules, Technology Forecasting and Social Change, vo. 71, 2005, p. 567-83.*
Bone and Saxon, Developing Effective Technology Strategies, Research Technology Management, vol. 43, No. 4, Jul./Aug. 2000, p. 50-58.*
Phaal et al., Technology Roadmapping: linking technology resources to business objectives, University of Cambridge, Nov. 2001, p. 1-18.*
Phaal et al., Technology Roadmapping—A planning framework for evolution and revolution, Technology Forecasting & Social Change, vol. 71, 2004, p. 5-26.*
Kaplan and Norton, The Strategy-Focused Organization, Harvard Business School Publishing Corp., 2001, p. 1-74 (pdf renumbering).*

* cited by examiner

Primary Examiner — Beth V Boswell
Assistant Examiner — Justin M Pats (57) ABSTRACT

Disclosed herein is a process for determining an effective strategy for growth and development of an enterprise that balances corporate goals and objectives with the technological challenges of providing solutions across the enterprise. A business capability roadmap (BCR) may be developed to express how capabilities derived from corporate strategy may be enabled in terms of people, process, and/or technology solutions as a time sequenced chain of activities. As the BCR solutions are developed, synergies and constraints with existing solutions, solutions under development, and solutions that are planned to be developed across the enterprise may be considered. Developing a BCR in terms of business capabilities provides abstraction of concrete assets that enables high level planning in terms that may be understood by both corporate and technology leadership within the enterprise.

17 Claims, 6 Drawing Sheets

| | Current State | Transition Strategy | 1H05 | 2H05 | 1H06 | 2H06 | 1H07 | 2H07 | Future State |
|---|---|---|---|---|---|---|---|---|---|
| People | 1)First 2)Second 3)Third | 1)Strategy 1 2)Strategy 2 3)Strategy 3 | Strat. 1 | Strat. 1 | | Strat. 2 | | Strat. 3 | 1)First 2)Second 3)Third 4)Fourth |
| Process | 1)First 2)Second 3)Third 4)Fourth | 1)Strategy 1 2)Strategy 2 3)Strategy 3 4)Strategy 4 5)Strategy 5 | Strat. 1 | | Strat. 3 | Strat. 2 | Strat. 4 | Strat. 5 | 1)First 2)Second 3)Third |
| Process | | | Strat. 1 | | Strat. 4 | Strat. 3 | | | |
| Technology | 1)First 2)Second 3)Third 4)Fourth 5)Fifth 6)Sixth 7)Seventh | 1)Strategy 1 2)Strategy 2 3)Strategy 3 4)Strategy 4 5)Strategy 5 6)Strategy 6 7)Strategy 7 8)Strategy 8 9)Strategy 9 10)Strategy 10 | | Strat. 2 | | Strat. 5 | Strat. 6 | Strat. 10 | 1)First 2)Second 3)Third 4)Fourth 5)Fifth 6)Sixth 7)Seventh 8)Eighth 9)Ninth |
| Technology | | | | | | | Strat. 7 | | |
| Technology | | | | | | | Strat. 8 | | |
| Technology | | | | | | | Strat. 9 | | |

BUSINESS PROCESS FOR DEVELOPING ENTERPRISE STRATEGY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

As enterprises grow and merge, markets change, and technologies improve, there is a need for enterprises to develop a strategy of how to grow and service customers. Some enterprises are structured such that strategy across the entire enterprise is decided by select people at the highest levels of the enterprise. Based on this high level strategy each individual business unit or "business domain" may tailor their growth to conform to the goals and objectives of the high level strategy.

A business domain may be a set of assets that serve a set of similar business needs. These business domains may be established based on funding, function, or any other logical divider. For example, if an enterprise is divided into business domains based on funding, then each business domain may receive a portion of the overall enterprise budget.

Some enterprises develop strategy for each business domain of the enterprise independent of other business domains. Each business domain may decide how to utilize their portion of the budget independent of the other business domains in the enterprise. Within each business domain, the growth strategy may be based on improving business functions of that domain. The growth strategy may be based on improving existing assets by evaluating asset lifecycles, and searching for synergies within the business domain to accomplish needed business functions.

The high-level strategy approach described above may lead to strategy being developed that may not take into account the impacts on individual business domains within the enterprise. The lack of rationalization across business domains may result in gaps and overlaps of the development and growth within each business domain. Further, some business domains may be detrimentally impacted by the high level strategy which may in turn negatively impact the enterprise as a whole. In contrast to the high-level strategy approach, the independent domain approach may result in duplicative work and duplicative development across the various business domains. This duplicative work and development inefficiently utilizes the enterprise resources. A need exists to correlate high level enterprise-wide strategy, objectives, and goals with business domain strategy, objectives, and goals so as to effectively manage enterprise growth and resources.

SUMMARY

Disclosed herein is a method of specifying a business capability roadmap. A current capability state may be displayed as a set of currently enabled capabilities. The current capability state may be determined based on an indication of available assets for each of multiple resource categories. A set of needed business capabilities may be derived based on a strategy statement stored in a strategy catalog, a list of in-progress and planned activities, the indication of available assets, and an indication of planned assets. A future capability state may be displayed as a set of desired capabilities for each of the resource categories. A time sequence of activities may be shown for enabling the set of needed business capabilities to accomplish a transition strategy from the current state to the future state for each of the resource categories.

Further disclosed herein is a method of comparing solutions for accomplishing enterprise strategy. The method may determine a set of needed capabilities in accordance with a strategy statement from corporate and technology leaders in an enterprise, any in-progress or planned activities, and any available or planned assets. A plurality of solutions may be developed for enabling a subset of the needed capabilities. A rating of each of the plurality of solutions may be based on a degree of association with both business and technology criteria. At least the strategy statement, the set of capabilities, a description of each of the plurality of solutions, and the rating for each of the plurality of solutions may be displayed. A solution for enabling the subset of needed capabilities may be selected based on the rating and implemented as one or more activities in a time sequence of activities for enabling the set of needed business capabilities.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although illustrative implementations of some embodiments of the present disclosure are disclosed below, the present system may be implemented using any number of techniques, whether currently known or in existence. The present disclosure should in no way be limited to the illustrative implementations, drawings, and techniques disclosed below, but may be modified within the scope of the appended claims along with their full scope of equivalents.

Disclosed herein are processes for determining an effective strategy for growth and development of an enterprise that balances corporate goals and objectives with the technological challenges of providing solutions to those goals and objectives across the enterprise. In some embodiments, corporate leadership of the enterprise articulates the overall goals and objectives of the enterprise in the form of strategy statements. Such strategy statements are interpreted and devolved into a set of required capabilities necessary to accomplish the corporate goals and objectives. A business capability roadmap (BCR) is cooperatively developed by both corporate and technology leaders to express what capabilities are needed and how the capabilities can be enabled in terms of people, process, and/or technology solutions. The BCR may take the form of a time sequenced chain of activities.

Through the cooperative development of the BCR the growth of the enterprise is rationalized across the business domains. Also, the development of technology solutions in each business domain can take into account existing and planned technology solutions across the enterprise in order to prevent duplicative work and development. The capabilities-based approach of the BCR provides a layer of abstraction that enables corporate leadership to communicate goals and objectives from a top-down perspective in such a way that they may be understood by technology leadership within the enterprise. The technology leadership can take a bottom-up perspective, interpreting the capabilities as a specification of desired assets. With this context, each domain within the enterprise can formulate the specific technology solutions to efficiently provide the capabilities needed to support corporate goals and objectives.

The processes disclosed herein aid in the determination of an effective strategy for growth and/or development of an enterprise by answering a series of questions: What are the set of assets that serve the enterprise today and how are the assets being used? What is the future need of the enterprise? How do you translate the decided future need into a set of solutions or an end-state of the enterprise? How do you adapt existing assets and develop new assets to enable the set of solutions? And, how do you discuss the activities that move the enterprise from the current state to the envisioned end-state?

In some embodiments, the processes disclosed herein produce a BCR. A BCR shows changes occurring in an enterprise in a manner that balances customer needs and operations to achieve business goals and objectives. Specifically, a BCR details enterprise strategy in terms of needed business capabilities and how development will occur to produce and implement the needed business capabilities in a time-sequenced manner. A capability may be defined as an ability to combine tangible and intangible assets to achieve an organizational objective. As used herein, a business capability is an expression of strategic objectives that may be accomplished in the form of people, processes, and/or technology. Developing a BCR in terms of business capabilities provides abstraction of concrete assets, such as specific systems and applications that enables high level planning in terms that may be understood by both corporate and technology leadership within the enterprise.

Figure 1:
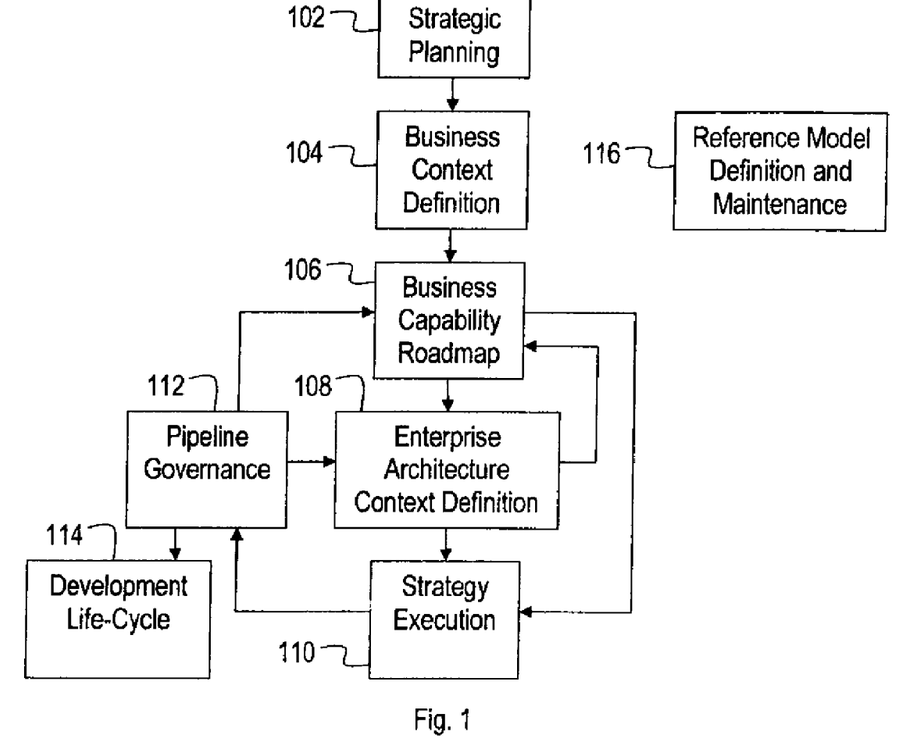
FIG. 1 shows an illustrative process for dynamically creating and updating enterprise strategy.

FIG. 1 shows an illustrative process for developing and implementing an enterprise strategy. In block 102, a strategic planning process is performed where executives in the enterprise make choices regarding the future they envision for the enterprise. These strategic choices may be expressed as various strategy statements. The executives may include the highest levels of management within the enterprise such as a chief executive officer or vice presidents as well as managers or directors of various business domains within the enterprise. Since the development of strategy involves both corporate and business domain leadership, an enterprise strategy may be developed that takes into consideration the enterprise as a whole as well as the needs and desires of each business domain. While the needs and desires of each business domain are considered, an enterprise strategy may be chosen that benefits the enterprise as a whole to the detriment of one or more business domains. The strategic planning process provides executive guidance towards the creation and development of solutions that accomplish the goals of the strategy statements.

In block 104, a business context is created that defines the implications of the strategy statements. For example, in block 102 it may be decided that four new products should be launched so as to increase enterprise revenue. In block 104, the implications of how development should be structured in order to accomplish the sale of four new products may be expressed in a business context defined. The business context definition may state that in order to accomplish the sale of the four new products a need exists to develop systems to sell the products, make improvements to billing systems in order to collect money for the sale of the products, develop processes for selling the products and collecting money in conjunction with the new systems, and provide oversight and management of the development and implementation of the new systems. In this manner the business context definition devolves a strategy statement into a set of required business capabilities. Formulating the business context definition in block 104 provides a sense of the high-level impact on the business.

In block 106, a jointly owned plan between executives, businesses, and developers may be created to address the capability list identified in block 104 in order to accomplish the envisioned change. Namely, a BCR is developed in block 106 that is used to effect the change in business capabilities in a time-sequenced manner. The process of developing a BCR is described in more detail below with reference to FIG. 3.

The BCR may be characterized as an external business driven view of change. An internal (business domain) view of change is created in block 108 by defining the capabilities in view of an enterprise architecture context. The enterprise architecture context definition provides a documentation of current and planned target states of business capabilities in terms of assets that enable the capabilities. This provides an asset oriented view of the enterprise over time. The process of creating and updating the enterprise architecture context definition is described in more detail below with reference to FIG. 6.

As shown in FIG. 1 the enterprise architecture context definition may be fed back to block 106. By feeding back the enterprise architecture context definition the BCR may be developed iteratively in a manner that enables consideration of both the current and target state architectures. Blocks 106 and 108 may be dynamic processes where one may be implemented prior to, concurrent with, or after the other as driven by natural business need and updates in business strategy. For example, if a business strategy is updated and a BCR is developed to create a set of solutions, then the enterprise architecture context definition may be updated to include the set of future solutions of the BCR. By implementing these blocks dynamically, a crossover between business needs and technological development is enabled.

In block 110 the BCR is executed to implement the strategy statement. Block 110 represents the transition from a planning stage to real world implementations of the strategy statement. This transition is accomplished by (1) creating specific projects aligned with approved BCRs to implement changes to create needed business capabilities, (2) performing value and cost analysis, and (3) obtaining the approvals and resource commitments necessary to complete the projects.

In block 112 project pipeline governance is performed. The project pipeline refers to the formal process for creating, analyzing, approving, prioritizing, funding, and executing projects. In one embodiment the projects are ordered in the pipeline according to an assigned priority discussed in more detail below. Alternatively, the projects may be ordered in the pipeline as first-in-first-out. The governance performed on the project pipeline in block 112 includes the approval and commissioning of projects to various business domains within the enterprise. The governance may be implemented in a centralized or a distributed fashion. The pipeline governance in block 112 may generate definitive lists of projects currently being worked on and projects that are planned to commence in the future. These project lists may be output to each of blocks 106 and 108 to be used in the creation of BCRs and architecture states as described in detail below. Once projects are completed they may go through standard software or hardware development lifecycles in block 114.

Independent and parallel with the process for developing and implementing an enterprise strategy is a process of defining and maintaining reference models in block 116. The reference models provide a common way for corporate leadership and diverse business domains to discuss and understand business capabilities. In block 116 the reference models are created, populated, cross-referenced, and sustained. The reference models defined and maintained in block 116 may be categorized as business reference models, application reference models, technology reference models, and information reference models.

Within the business reference model category, reference models may include a customer experience model, a component business model, an external business communication model, and a business process flow model. The customer experience model may summarize the customer touch points, or interactions customers have with the enterprise and any of its products. The component business model organizes key business functions into logical groupings that may closely resemble the functional organization of the enterprise. The external business communication model may describe the communication with external entities such as major customers, business partners, and vendors. In one embodiment, the external business communication model may be defined in accordance with the industry standard enhanced Telecom Operations Map (eTOM). The business process flow model may describe how the enterprise accomplishes its work by modeling the interconnection of business functions needed to accomplish a business result.

Within the application reference model category, reference models may include a logical reference architecture model and an application domain model. The logical reference architecture model may describe a high level view of the logical interactions between applications within the enterprise. The application domain model may organize applications performing similar functions into logical groupings. For primary business functions, the application domains may align with the boundaries of the component business model, while for infrastructure and support business functions the application domains may relate to many different business functions.

Within the technology reference model category, reference models may include a technology taxonomy model and a network capability domain model. The technology taxonomy model may organize licensed and purchased hardware and software based on their primary function. The network capability domain model may classify and describe network assets, their inherent capabilities, and how those capabilities support the enterprise.

Within the information reference model category, reference models may include an information model. The information model may describe the semantic of and relationships among system information elements including descriptions of information elements as objects, static schemas, dynamic schemas, and invariant schemas. The information model may also describe system functionality as components of computational objects, interfaces, interactions, clients, servers, producers, and consumers. As a whole, the information model describes databases where data is stored, interface messages of how data is moved, interface relationships of how systems share information, and interface mappings of paths that information travel. Some other reference models under the information reference model category may include models for organizing and describing information used by the enterprise based on the ownership of the information, how the information is shared, and the interfaces used to share the information.

In developing a BCR, solutions may be created to meet needed business capabilities. The needed business capabilities may be classified and discussed based on how they may be described using the reference models of block 116. For example, business capabilities may be classified based on how they impact customer touch points defined in the customer experience model. Also, by grouping business functions and applications, related systems may be easily reviewed to more easily perform rationalization and transformation efforts of a BCR.

Figure 2:
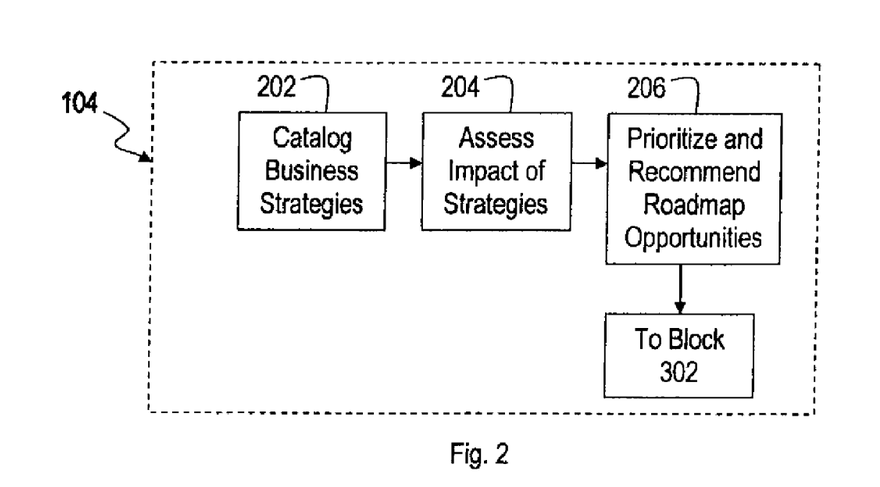
FIG. 2 shows an illustrative process for creating a business context definition for enterprise strategy development.

FIG. 2 shows an illustrative process for creating the business context definition in block 104. Before any business capabilities may be developed, a clear understanding of the desires and direction that executives want the enterprise to grow towards should first be obtained. In block 202, a catalog of business strategy statements may be generated and maintained of various enterprise strategies through an ongoing dialogue between executives and strategic planners. As noted above, this dialogue may include the corporate and business domain leadership that created the strategy statements in order to coordinate strategic planning across the enterprise. The strategic planners may further include project development and technology leaders in the enterprise who would understand the basic impacts of strategies in terms of people, process, and technology. The generation and maintenance of the business strategy catalog may be accomplished by having business domain leadership as well as corporate leadership create individual sets of strategic objectives which may then be negotiated with the strategic planners to create the business strategy catalog. The dialogue between executives and strategic planners to create new strategies may occur periodically, such as on a yearly basis. The dialogue may also take place upon the occurrence of major industry or enterprise events, such as the development of new industry technology, mergers, regulatory changes, economic changes, etc.

The business strategy catalog may be stored in a central location so that its content may be easily located and reviewed. Having the business strategy catalog stored in a central location provides developers and strategic planners with timely access to enterprise strategy statements as they are created. Previous versions of the business strategy catalog may also be stored and cataloged. When a change or update is made to the business strategy catalog, the new version may be compared with previous versions in order to identify areas of significant change. Management and developers in the areas that may be impacted by the change may be notified so that they may begin to prepare for the creation or updating of business capabilities.

In addition to the business strategy catalog, a BCR planning calendar may also be generated and maintained. The BCR planning calendar organizes information about current and future projects being implemented to accomplish strategic goals as a time sequence dependency chain for each business domain. The BCR planning calendar may indicate the planned dates as well as unofficial target dates for executing and completing projects for providing needed business capabilities. The BCR planning calendar may also indicate the timing of current and future BCR engagements. A BCR engagement is the process of developing a BCR. The content of the BCR calendar is described in more detail below. Taken together, the business strategy catalog and the BCR planning calendar enable a clear understanding of an overall strategic direction for the enterprise, when new strategies may be implemented, the planning process for each strategy, and when business capabilities that accomplish strategic objectives may be completed or updated.

In block 204, any new or updated strategy statements in the business strategy catalog are analyzed to asses their impact in terms of new capabilities needed to accomplish the strategy. The business needs may be expressed as expectations of change required in people, process, and/or technology to support each strategic statement. Also, each strategy statement may be analyzed to determine a degree of impact caused to key reference models maintained in block 116. The results of the impact analysis may be used to annotate each strategy in the business strategy catalog so that others can better understand the capabilities needed for each strategy. The business strategy catalog may be annotated by including a descriptive list of required changes in people, process, and technology, as well as an indication of the degree of impact to the key reference models.

In block 206, a prioritization and recommendation of strategies that should undergo BCR engagements is made. Due to resource limitations, every new or updated strategy statement may not result in a BCR engagement. If there are such resource limitations, then one or more strategy statements may be chosen to undergo a BCR engagement based on a prioritized list of BCR opportunities. This prioritization enables the enterprise to gain the greatest value out of the resources allocated for BCR engagements. Opportunities for BCR engagements may be identified and ranked against overall strategic goals, resulting in one or more recommended BCR engagements.

The prioritization and recommendation of BCR engagements may be accomplished by creating a consolidated list identifying all possible BCR opportunities including both strategy driven and non-strategy driven BCR opportunities. Each BCR opportunity on the consolidated list may then be assigned a score according to a set of criteria appropriate for the enterprise or the strategic goals of the enterprise. For example, the criteria may include a scoring of the BCR opportunities based on relationship, readiness, risk, and priority. Further, each criterion may be weighted, for example, such that more weight is given to priority and less is given to relationship. This scoring may be accomplished by developing proprietary scoring software or spreadsheets, or by using off the shelf decision support software such as the software solutions developed by EXPERT CHOICE. Each BCR opportunity may also be rated based on an estimated size and level of effort to complete a BCR engagement. Once each BCR opportunity has been rated, leadership in each of the impacted business domains may produce a recommendation for the prioritization and engagement of BCR opportunities. Each recommendation may require executive review since each recommendation is an implied commitment of enterprise resources to support the BCR engagement. A consensus of which BCR opportunities will be pursued and the order in which they are pursued may be obtained through negotiations with appropriate corporate and business domain leadership. As shown in FIG. 2, the results of the prioritization and recommendation are fed on to block 302 to perform the BCR engagements in the recommended order as described in detail below.

Figure 3:
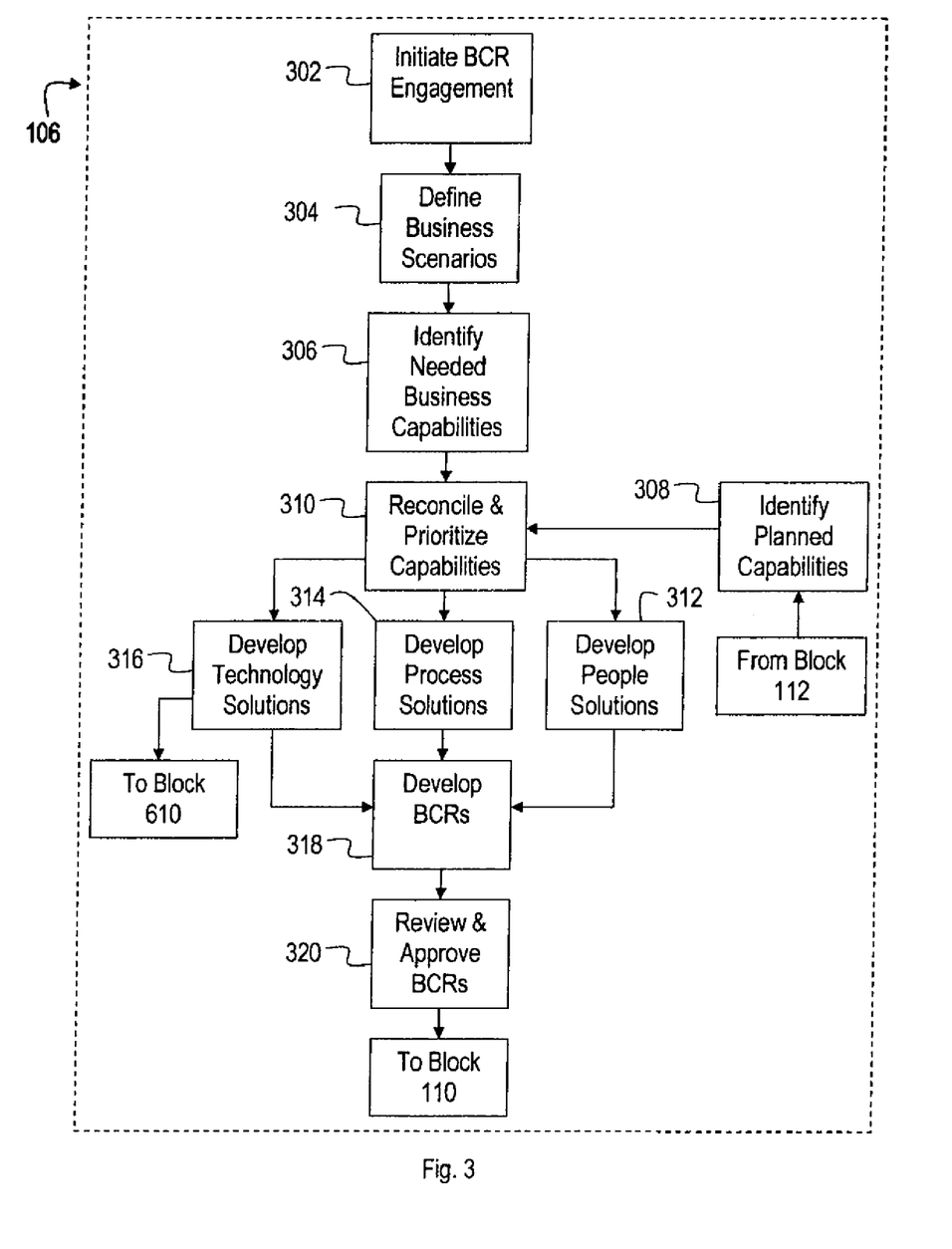
FIG. 3 shows an illustrative process for developing a business capability roadmap (BCR).

FIG. 3 shows an illustrative process for developing the BCR in block 106. The process of FIG. 3 provides a structured way for corporate leadership and technology leadership to collaborate in building a jointly-owned plan for the future. In this process, solutions are developed as projects to be completed to enable needed capabilities in terms of people, processes, and technology. The developed solutions are then aligned as a BCR, i.e., a time-sequenced plan to implement the solutions in a BCR calendar that may be referred to during project initiation and governance in block 112.

In block 302, based on the prioritization and recommendation of BCR engagements in block 206, a collaborative planning effort to initiate a BCG engagement is performed. The collaborative planning may take place between all of the parties that may be impacted by the BCR engagement starting with staff working with a business domain manager or director on up to high level corporate leadership. Through this initiation dialogue a shared understanding and commitment to a common BCR goal may be gained which increases the likelihood of a successful BCR engagement and the effectiveness of the results.

The initiation dialogue may begin by a core group of staff and business domain leadership exploring the possibility of a successful BCR engagement. This exploration may include a determination of whether or not the BCR engagement aligns with a strategy statement, a definition of needed capabilities and value added by the capabilities, and the readiness and willingness of all impacted parties to proceed with the BCR engagement. A BCR engagement may be determined to not have a likelihood of success if, for example, the BCR engagement is not aligned to a current strategy statement, the value added by the development of a capability does not justify the expense of a BCR engagement, one or more areas impacted by the BCR engagement do not have sufficient resources to proceed, etc.

Once the BCR engagement is determined to have a likelihood of success, the scope of the BCR may then be negotiated. This negotiation may include managers and directors from all of the areas impacted by the BCR engagement. Through the negotiation a determination may be made of the people, processes, and technology that will be impacted, as well as what corporate leadership groups should be included in the engagement. A BCR engagement plan may then be developed that indicates draft project plan(s), project leads, and estimated staffing levels needed in order to accomplish the project(s). The draft project plan(s) may be based on the capability requirements determined in block 204. Based on the engagement plan an estimate may be made of the total financial costs and benefits of the project(s) such that a cost benefit analysis may be performed. Also, a recommended funding approach for the BCR engagement may be determined. The plan may be organized and documented in a BCR charter. The BCR charter may be presented to the appropriate executive sponsors, such as the executives that developed the strategy statements in block 102. The executive sponsors may review and approve the BCR charter and provide funding and staffing commitments necessary to initiate the BCR engagement. The staffing commitments include all of corporate leadership as well as business domain leadership and staff that are collectively referred to as the BCR team.

In block 304, the business scenarios within the scope of the BCR engagement are defined. By defining the business scenarios, the BCR team gains an understanding and quantification of the current state and target state of business processes and objectives in the context of the strategy statements that drive them. The business scenarios are defined by first identifying existing process models. The existing process models may include historic models, current models, and planned future models. Within the scope of the BCR engagement the existing process models are examined to identify gaps and deficiencies in current business processes and practices in order to accomplish the strategy of the BCR engagement. In accordance with the identified gaps and deficiencies, a target business scenario state is defined that reflects the needed business processes and practices to fill in the identified gaps and deficiencies. For example, a business scenario detailing a new way to sell products through the web may be needed. Through this process the scope of the BCR engagement is clearly defined through the business scenarios. The current and target business scenarios may be mapped to the reference models of block 116 to provide a common way for diverse business domains to discuss and understand the business processes needed for the BCR engagement.

In block 306, the business capabilities needed to implement the business scenarios are exhaustively identified. For each business scenario, all of the current capabilities in terms of people, process, and technology are identified. The current capabilities may be identified by first determining all of the current capabilities in each domain that may be impacted within the scope of the BCR engagement. Each of the current capabilities may then be analyzed to determine their context, scope, and constraints. Based on this detailed view of current capabilities new or updated capabilities may be defined in order to satisfy the requirements of each business scenario identified within the scope of the BCR engagement. Again, the new or updated capabilities may be mapped to the reference models of block 116 to provide a common way for diverse business domains to discuss and understand the capabilities needed for the BCR engagement.

In block 308, all of the planned capabilities within the scope of the BCR engagement are identified. As shown by the input from block 112, the identification of the planned capabilities is based on determining what capabilities are achieved through the projects currently in the pipeline. By analyzing the projects currently in the pipeline, a cross mapping of related capabilities across the entire enterprise that may be used in the current BCR engagement may be identified. As such, synergies and constraints with projects being developed by a different business domain or other groups within the enterprise may be taken into account when determining a needed capability in a current BCR engagement. Examining current and planned systems and solutions in terms of capabilities enables a basis for comparing diverse solutions across the enterprise. For example, by examining capabilities, a feature of a call-center might be identified as fulfilling a needed capability for a billing system. Looking at each of these diverse systems as a whole or even the types of solutions that are present or may be developed in each of these systems an overlap may not be easily recognized. By breaking each of the systems and solutions down into a set of capabilities that can be accomplished by each system, assumed biases of the specific technology used in each system may be removed so that diverse systems may be more easily compared and analyzed to identify synergies or constraints. By taking into account what capabilities are being developed across the enterprise as a whole, duplicative development of solutions or capabilities may be prevented.

In block 310, based on the needed capabilities identified in block 306 and the planned capabilities identified in block 308, a reconciled and prioritized list of capabilities may be created. This may be accomplished by identifying any remaining gaps or overlaps between needed capabilities and planned capabilities. In the case of overlaps, possible constraints and synergies may be identified so as to reconcile the overlaps. The constraints may be identified such that new capabilities are not developed in conflict with existing capabilities. Also, possible synergies may be identified so as to increase the value of the enterprises investment into development. For example, if an application is in the pipeline or currently under development to enable a capability, it may be determined that a synergy exists between the application and a needed capability of a current BCR engagement. For instance, it may be determined that it is cheaper to provide the needed capability as an additional feature that may be added to the application currently under development rather than developing an entirely new application.

The capabilities of the remaining gaps and the solutions to reconcile overlaps in capabilities through eliminating conflicts or encouraging synergies may then be prioritized. The priorities of needed capabilities may be based on the priority of planned capabilities within the scope of the BCR engagement such as those that are in the pipeline to be developed or in the process of being developed. In this way, each time a BCR engagement occurs the priority of capabilities identified as needed by the BCR engagement as well as the priority of all capabilities within the scope of the BCR engagement that have already been planned may be examined and/or reprioritized.

For example, in the case of a synergy identified with a planned capability, a capability for the current BCR engagement may be given a higher priority than if the synergy was not exploited. In particular, a project may be under development that has a synergy with a needed capability and the project has a priority such that it is required to be completed by a certain date. In order to take advantage of the synergy with the needed capability, the project may be modified to also provide the needed capability within the date required. As such, the priority of the needed capability would be increased to correspond with the priority of the project under development.

Similarly, the priority of planned projects may be reprioritized based on the priority of the current BCR engagement. For example, a current BCR engagement as a whole may have a higher priority than a previous BCR engagement that has projects in the pipeline to be developed or in the process of being developed. In this case, the projects for the previous BCR engagement may be moved back further in the pipeline, delayed, or even canceled.

In blocks 312-316, real world solutions are developed in response to the capabilities identified in block 310 in terms of people, process, and technology solutions. In block 314, new methods and procedures may be developed to successfully deploy any new technology solutions developed in block 316. In block 312, new roles or staff may be created to implement the processes developed in block 314 and maintain and manage the technology developed in block 316. For example, in block 316 a new catalog of technology may be developed. In order for the new catalog to be successfully deployed, a new role and staff position may be defined in block 312 that is responsible for maintaining the content of the catalog. Further, processes may be developed in block 314 to define the way in which people are going to use the new catalog. In developing a solution for a needed capability, solutions may not need to be developed for all of people, process, and technology. For example, a process may be developed in block 314 that provides a needed capability that uses existing staff and technology. Each of the solutions may be developed in parallel and in concert with each other. For example, technology solutions may be developed such that any new processes being developed may be implemented on the new technology. This again provides a point for discussion between business leadership, that defines people and process solutions in blocks 312 and 314, and technology leadership, that defines technology solutions in block 316.

Figure 6:
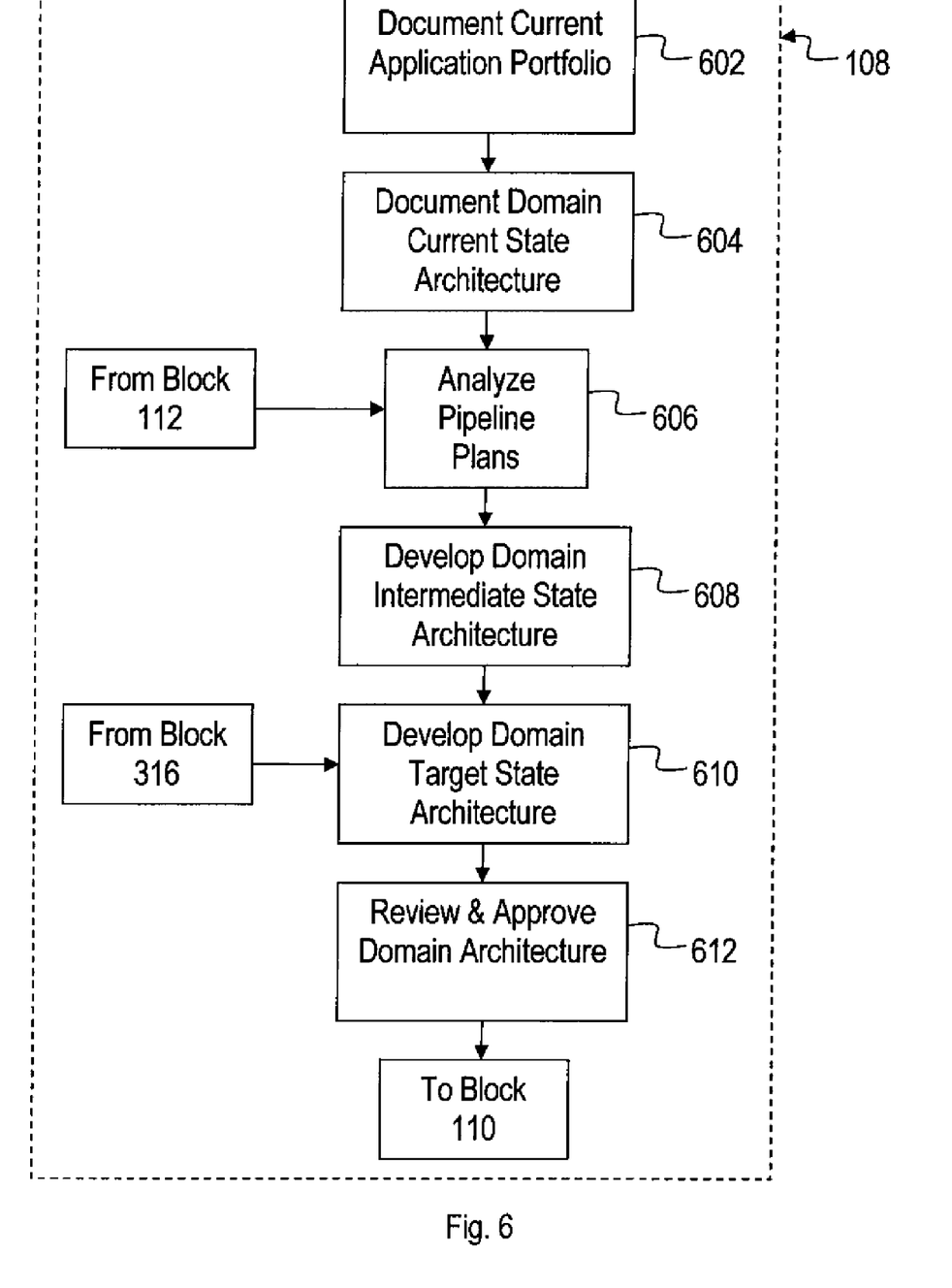
FIG. 6 shows an illustrative process for defining an enterprise architecture context.

In order to facilitate the development of technology solutions in block 316, a number of outputs from other process blocks may need to be examined. For example, technology and architecture standards within the context of the BCR engagement as defined in block 116 or set by industry may be used to provide a structure for creating new solutions. The prioritized list of needed capabilities determined in block 310 may be used to provide an order for developing technology solutions. Each of the current, intermediate, and target domain state architectures from blocks 604, 608, and 610 may be used to provide an understanding of what solutions are already available in each domain, in the process of being developed for each domain, and give a direction that each domain is heading as described in more detail below. These domain state architectures as well as the current application portfolio documented in block 602 may be used to develop solutions that take advantage of any synergies across the enterprise that may be exploited from existing solutions or solutions that are currently being developed while preventing possible conflicts with a desired intermediate or end-state of each domain. For example, the development of technology solutions in block 316 may be correlated with any technology solutions that are being developed as driven by sustaining operations to take advantage of possible synergies and prevent possible conflicts as described more in detail below with blocks 606 and 608. Further, other capability solutions within the context of the BCR engagement that may be available to the enterprise, such as any systems or applications that may be purchased to accomplish needed capabilities, may also be considered when developing the technology solutions.

In block 316, the prioritized list of needed capabilities determined in block 310 may be examined such that the priorities may be grouped together. The grouping may be based on natural break points such as the type of function being accomplished by the capability or the domain that may be impacted by each capability. For example, the domain state architectures of blocks 604, 608, and 610 may be examined to determine which domains each capability might impact. Based on the grouping of capabilities, solutions may be determined that enable one or more capabilities. For example, a single technology solution may enable an entire group of needed capabilities.

For each group of capabilities, a set of technology solutions may be determined that may enable the needed capabilities. Each solution may suggest the development of different systems or applications or take a different approach to providing the needed capabilities. For example, one solution may suggest the development of a large system to implement a group of needed capabilities, whereas another solution may modify a large number of existing systems to provide the same group of needed capabilities. Each of the solutions may be analyzed for strengths and weaknesses. For example, the strengths and weaknesses of each solution may be compared using guiding criteria such as how well a each solution conforms to the desired direction that the enterprise is heading, constraints on how well new technologies would interact with existing and planned technologies, the risk associated with the development of new technology solutions, implementation and operational costs, and the organizational readiness of the impacted domain to be able to undergo the development of the new technology solutions. At this stage of development any additional executive direction or ideas may also be considered when creating the technology solutions.

Figure 4:
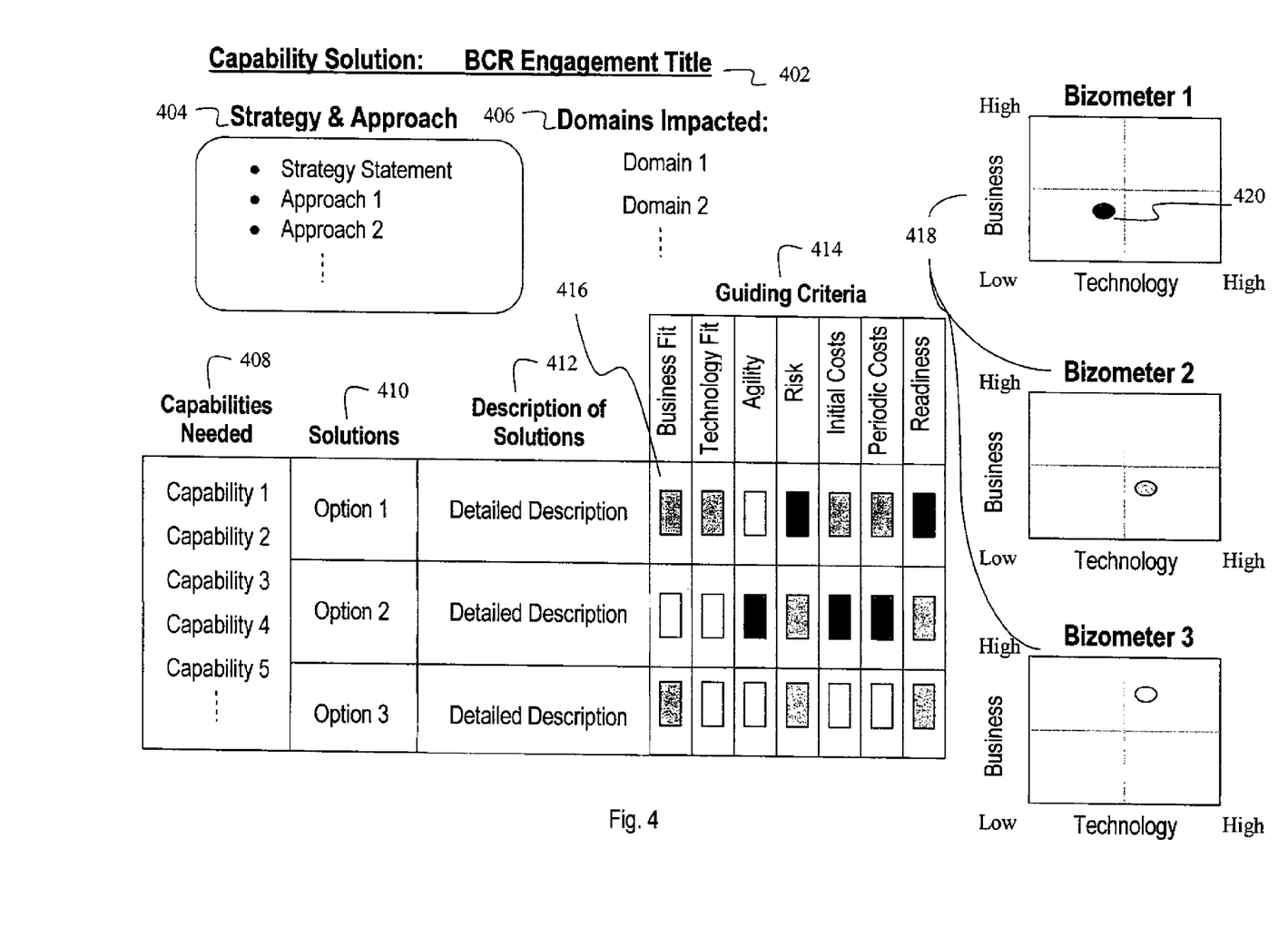
FIG. 4 shows an illustrative comparison tool to compare different solutions of a strategy.

The strengths and weaknesses of the solutions may be reviewed and negotiated until a solution is recommended for each group of capabilities. FIG. 4 depicts an illustrative organizational tool that may be used to analyze the strengths and weaknesses of each solution. The organizational tool of FIG. 4 includes the title of the BCR engagement 402, an area 404 describing the strategy that is driving the BCR engagement as well as a description of various approaches to accomplish the strategy. The organizational tool also indicates the group of capabilities that is being reviewed 408, the domain(s) that these capabilities impact 406, the different solutions 410 that may be used to provide the group of capabilities, and a detailed description 412 of each solution.

Each solution may be compared using one or both of two comparison tools shown in FIG. 4. In a first comparison tool, a score 416 is assigned to each solution for each of the guiding criteria 414 described above. Lighter shading indicates a better score 416 and a darker shading represents a worse score 416. For example, solution Option 1 has a good score 416 for the "Agility" criteria, a medium score 416 for the "Technology Fit" criteria, and a bad score 416 for the "Risk" criteria. As seen form the scoring using this comparison tool, Option 3 appears to be the best solution for providing each of the capabilities. A second comparison tool is the set of bizometers 418. The bizometers indicate a score 420 in terms of a solution providing a measure of a degree of association between a solution and business goals and how well the solution fits with existing and planned future technology states. As shown in FIG. 4, there is a bizometer 418 for each of the three options wherein, similar to the results found using the first comparison tool, the third solution option is found to have the highest association in terms of both business and technology fit.

Based on the technology solutions decided as discussed above, a new target domain state architecture may be created which defines an updated desired end-state for each domain within the scope of the BCR engagement. As shown in FIG. 3, the technology solutions developed in block 316 may be input to block 610 of FIG. 6. As described in detail below, block 610 of FIG. 6 defines a target state of each domain within the enterprise.

Figure 5:
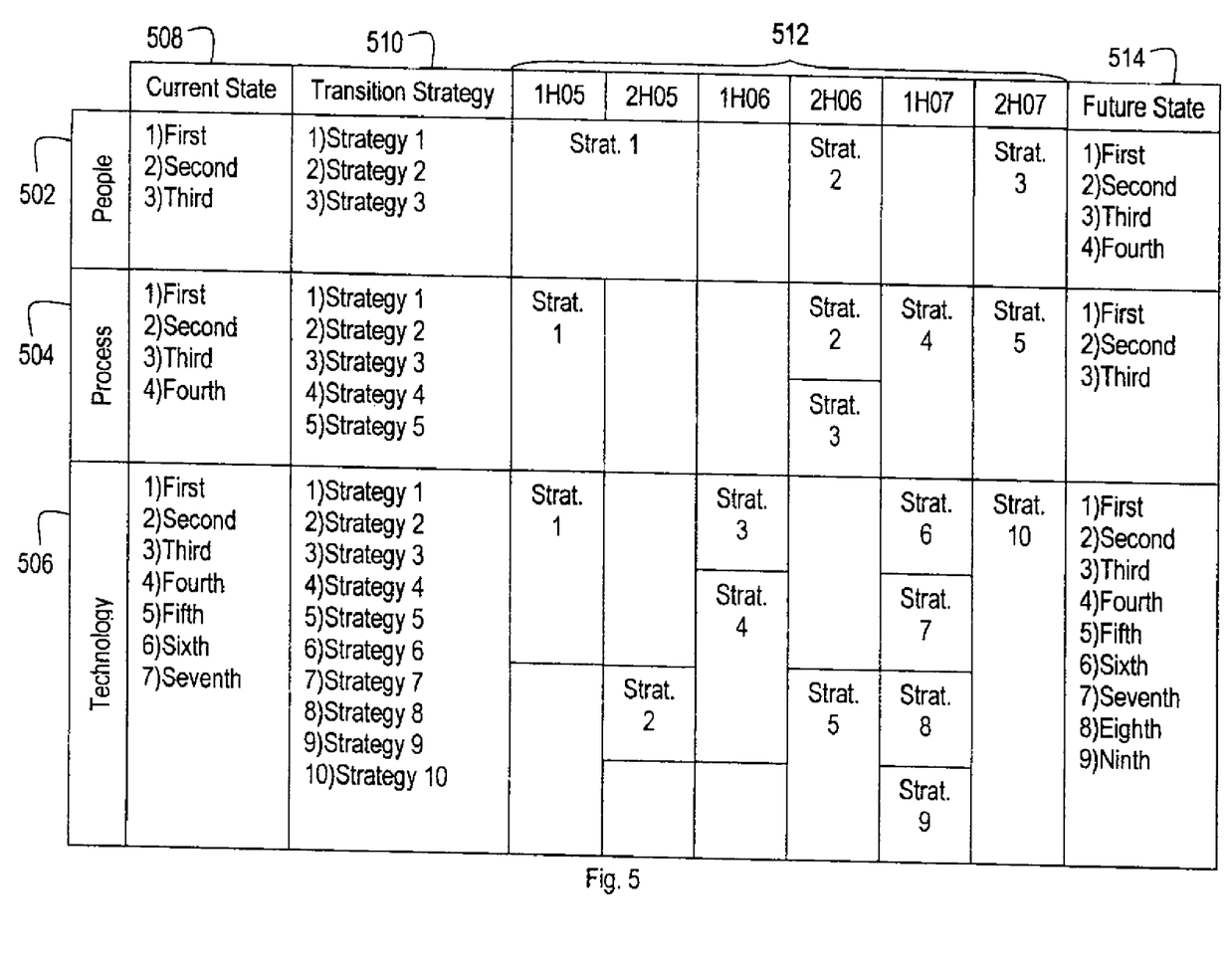
FIG. 5 shows an illustrative BCR calendar.

In block 318, the BCR is developed. The BCR shows a time sequenced view of capabilities as they are developed and delivered. FIG. 5 depicts an exemplary BCR calendar showing when work for a series of categorized activities occurs in a timeline 512. The BCR calendar may categorize the activities based on changes occurring to people 502, processes 504, and technology 506. The BCR calendar may further categorize the activities as sub-categories (not shown) of changes occurring to people 502, processes 504, and technology 506. Each of the activities may be represented as a description of the capabilities that are being developed or eliminated, or of the particular solutions that are being modified or created for each category 502, 504, and 506. The BCR calendar may include a brief description of the current state 508 of capabilities placed before the timeline 512, and a desired future state 514 of capabilities placed after the timeline 512. The BCR calendar may also show a detailed description of the strategy or solutions 510 for transitioning from the current state 508 to the future state 514 that are driving the activities. The BCR calendar may also include an indication (not shown) of the current place in the timeline so as to distinguish from activities that have already been completed and those remaining to be completed in order to complete the transition to the future state 514. Each of the transition strategies or solutions may be shown in the timeline 512 indicating the length and order of activities to accomplish the transition strategy or solutions. Some of the activities in the timeline 512 may be activities that were already planned prior to or under development at the time of the commencement of the current BCR engagement. While the BCR calendar is illustrated in FIG. 5 as giving a textual timeline, a similar calendar may be created using graphical icons to represent an activity corresponding to a particular transition strategy. The BCR calendar may be tailored for different audiences such that one or more BCR calendars show a timeline of capabilities by domain, by corporate sponsor, by dependency, etc.

The BCR calendar may be created by extracting the capabilities from the capability solutions developed in each of blocks 312-316 as well as the future state views of each domain in the enterprise, described in more detail below. Based on all of the solutions for the extracted capabilities and/or their priorities, a dependency chain may be determined such that the capabilities may be structured into a time sequenced list of activities that may be tracked by the BCR calendar.

Note that based on the priorities determine in block 310, the dependency chains for developing capabilities across business domains may be different. For example, a capability may be waiting to be developed through a first project in a first business domain. The dependency chain in the first business domain may have the first project waiting for another month before work begins on the first project. A second business domain may have a capability that is waiting to be developed in a second project that depends from the first project. If the second business domain has established its dependency chain such that the second project should begin as soon as possible, then the dependency in the second business domain may lead to needing to implement the first project earlier.

In block 320, final approval of the BCR is obtained from the same business domain and corporate leadership that initiated the BCR engagement in block 302. In order to gain the approval a presentation of the recommended solutions and the BCR may be given to the business domain and corporate leadership. By having this leadership involved from the start of the BCR engagement the solutions that are developed by the BCR team do not have to be sold to the executives or compete heavily against other projects because the executives were engaged through the whole process. Further, the BCR team has a powerful negotiating point for obtaining proper funding since executive guidance has been directing the process from the beginning. A rough determination of the budget that may be given to complete all of the projects in the BCR may also be obtained at this point. This may help break the cycle of having to fight against less critical projects to maintain the funding for the projects in the BCR each month. Upon obtaining the approval and rough budget for the BCR, the BCR may begin to be implemented as described above in block 110. This process enables a top-down view of capabilities that are driven by business strategies from the perspective of executive leadership coupled with a bottom-up view of technology solutions for each domain that enable the capabilities.

FIG. 6 shows an illustrative process for developing the enterprise architecture context definition in block 106. The enterprise architecture context describes an asset oriented view of technology solutions in terms of applications and systems that support the business of today and how those technologies must change to support the business of tomorrow. The enterprise architecture context describes the transition through a detailed description of the current, intermediate, and target domain state architecture in the enterprise. A domain state architecture is essentially a description of the configuration of assets and resources available in a particular domain. The enterprise architecture context is described through documenting all assets in their current form, tracking changes being made by active work, and developing consistent plans that explain how these assets are expected to change over time. The enterprise architecture context definition may be periodically updated or updated whenever changes occur.

In block 602, the current application portfolio may be documented. The application portfolio may detail a breakdown of hardware and software that cooperate to provide each application. For example, the application portfolio may indicate that a particular system is using hardware that is composed of a particular set of components. The hardware runs software that implements a set of software modules, wherein each module has interfaces to one or more other software modules. In this way a detailed view of the technology present with each application is documented.

In block 604, a current domain state architecture is documented that details how each of the applications are interconnected. The current domain state architecture provides a clear understanding on how all of the assets cooperate to solve business problems and describe what the assets collectively do.

In block 606, pipeline plans are analyzed in order to determine how the current state architecture is going to be changed based on projects that are in progress. As shown in FIGS. 1 and 6, the output of the pipeline governance block 112 is input into block 606 to perform the pipeline analysis. By analyzing everything in the pipeline, not only are changes identified that are driven by strategy, such as BCR projects, but changes are also identified that are driven by sustaining operations. Some such sustaining operations may include a need to change systems or applications based on technology advances, the expiration of operational lifecycles of enterprise technology, and vendors no longer supporting applications and system used by the enterprise. This analysis provides a view of the intermediate domain state architecture in block 608 that indicates a sum total of all of the changes that are in progress as driven by sustaining operations in the enterprise. The sum total view provided by the intermediate domain state architecture does not describe the enterprise as it is now, but where it should be if everything goes to plan.

In block 610, a target domain state architecture is developed that takes into account both planned changes identified in block 608 as well as future changes. The future changes may be driven by strategy through BCR engagements as shown by the input from block 316. The target domain state architecture defines the desire ideal end-state for each domain and may include a description of the desired target state and a listing of new and changed capabilities.

In block 612, the target state architecture for each domain may be reviewed and approved. The review and approval may include analyzing all of the changes driven by both sustaining and BCR engagement activities. The analysis may include determining the impacts of all of the changes such that the target state architecture is aligned to approved or in progress BCRs. As each domain provides the final approval for their target state architecture this process enables a bottom-up view of enterprise technology and capabilities from the perspective of each business domain.

Disclosed above are processes for determining an effective strategy for growth and development of an enterprise that balances corporate goals and objectives with the technological challenges of providing solutions to those goals and objectives across the enterprise. In some embodiments, corporate leadership of the enterprise articulates the overall goals and objectives of the enterprise in the form of strategy statements. Such strategy statements are interpreted and devolved into a set of required capabilities necessary to accomplish the corporate goals and objectives. A business capability roadmap (BCR) is cooperatively developed by both corporate and technology leaders to express what capabilities are needed and how the capabilities can be enabled in terms of people, process, and/or technology solutions. The BCR may take the form of a time sequenced chain of activities. The BCR enables an abstraction of concrete assets that enables high level planning in terms that may be understood by both corporate and technology leadership within the enterprise.

Figure 7:
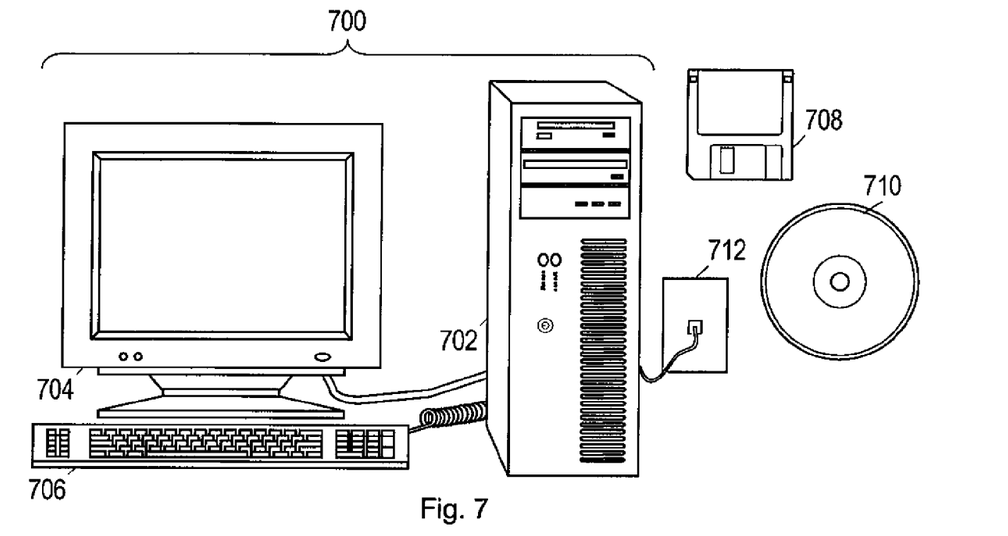
FIG. 7 shows an illustrative business capability roadmap system embodied as a desktop computer.

FIG. 7 shows an illustrative system 700 that may be used in support of any of the process blocks described above. System 700 is shown as a desktop computer 700, although any electronic device having some amount of computing power coupled to a user interface may be configured to carry out the methods disclosed herein. Among other things, servers, portable computers, personal digital assistants (PDAs) and mobile phones may be configured to carry out aspects of the disclosed methods.

As shown, illustrative system 700 comprises a chassis 702, a display 704, and an input device 706. The chassis 702 comprises a processor, memory, and information storage devices. One or more of the information storage devices may store programs and data on removable storage media such as a floppy disk 708 or an optical disc 710. The chassis 702 may further comprise a network interface that allows the system 700 to receive information via a wired or wireless network, represented in FIG. 7 by a phone jack 712.

The chassis 702 is coupled to the display 704 and the input device 706 to interact with a user. The display 704 and the input device 706 may together operate as a user interface. The display 704 is shown as a video monitor, but may take many alternative forms such as a printer, a speaker, or other means for communicating information to a user. The input device 706 is shown as a keyboard, but may similarly take many alternative forms such as a button, a mouse, a keypad, a dial, a motion sensor, a camera, a microphone or other means for receiving information from a user. Both the display 704 and the input device 706 may be integrated into the chassis 702.

Figure 8:
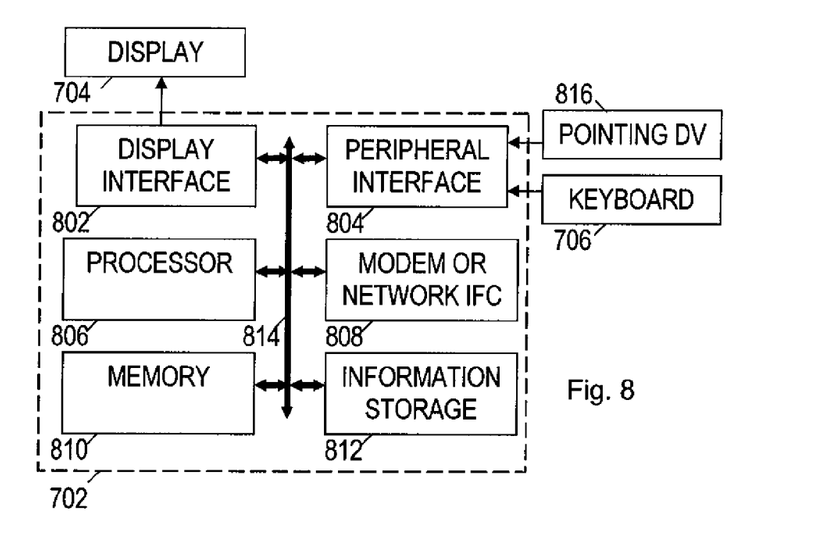
FIG. 8 shows a block diagram of an illustrative business capability roadmap system.

FIG. 8 shows a simplified functional block diagram of system 700. The chassis 702 may comprise a display interface 802, a peripheral interface 804, a processor 806, a modem or other suitable network interface 808, a memory 810, an information storage device 812, and a bus 814. System 700 may be a bus-based computer, with the bus 814 interconnecting the other elements and carrying communications between them. The display interface 802 may take the form of a video card or other suitable display interface that accepts information from the bus 814 and transforms it into a form suitable for the display 704. Conversely, the peripheral interface 804 may accept signals from the keyboard 706 and other input devices such as a pointing device 816, and transform them into a form suitable for communication on the bus 814.

The processor 806 gathers information from other system elements, including input data from the peripheral interface 804, and program instructions and other data from the memory 810, the information storage device 812, or from a remote location via the network interface 808. The processor 806 carries out the program instructions and processes the data accordingly. The program instructions may further configure the processor 806 to send data to other system elements, comprising information for the user which may be communicated via the display interface 802 and the display 704.

The processor 806, and hence the computer 700 as a whole, operates in accordance with one or more programs stored on the information storage device 812. The processor 806 may copy portions of the programs into the memory 810 for faster access, and may switch between programs or carry out additional programs in response to user actuation of the input device. The additional programs may be retrieved from information the storage device 812 or may be retrieved from remote locations via the network interface 808. One or more of these programs configures system 700 to carry out at least one of the process blocks disclosed above.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method of specifying a business capability roadmap, comprising:

displaying, by a computer, for each of multiple resource categories, a current capability state of an enterprise as a set of currently enabled capabilities based on an indication of available assets of the enterprise, wherein the enterprise comprises a plurality of business domains, and wherein a capability is an ability enabled by one or more assets;

deriving, using a computer, a set of needed business capabilities for the enterprise based on a strategy statement of the enterprise stored in a strategy catalog, a list of in-progress and planned projects across the enterprise, the indication of available assets of the enterprise, and an indication of planned assets of the enterprise, wherein deriving the set of needed business capabilities comprises:

devolving the strategy statement into a set of required capabilities for the enterprise;

abstracting the in-progress projects across the enterprise, planned projects across the enterprise, and the planned assets of the enterprise into a set of future capabilities for the enterprise;

abstracting the available assets of the enterprise into a set of available capabilities for the enterprise; and reconciling the set of required capabilities with the set of available capabilities and the set of future capabilities to determine the set of needed capabilities for the enterprise;

developing a plurality of solutions that enable a subset of the needed capabilities;

rating each of the plurality of solutions based on a degree of association with both business and technology criteria;

selecting a solution of the plurality of solutions that enables the subset of needed capabilities based on the rating;

showing, by a computer, a plurality of time sequences of projects that enable the set of needed business capabilities to accomplish a transition strategy from the current state to a future state, wherein one of the plurality of time sequences of projects is shown for each of the resource categories, and wherein each of the projects of the plurality of time sequences of projects is assigned to one or more of the plurality of business domains;

implementing the selected solution as one or more projects in one of the plurality of time sequences of projects that enable the set of needed business capabilities; and displaying, by a computer, for each of the resource categories, a future capability state of the enterprise as a set of desired capabilities that are enabled as a result of completing the projects.

2. The method of claim 1, wherein the strategy statement is an articulation of a strategic goal by leadership of the enterprise.

3. The method of claim 2, wherein the leadership of the enterprise includes both business and technology leadership.

4. The method of claim 1, further comprising:
displaying the transition strategy as a list of the projects for transitioning from the current state to the future state for each of the resource categories.

5. The method of claim 1, wherein the resource categories include a category for each of people, processes, and technology.

6. The method of claim 1, wherein the projects are sequenced in accordance with a priority assigned to each project.

7. The method of claim 1, wherein the in-progress and planned projects are driven by both strategy and sustaining operations.

8. The method of claim 1, further comprising:
maintaining the strategy catalog, the list of in-progress and planned projects, and the indication of available and planned assets.

9. The method of claim 8, wherein the indication of planned assets is maintained by updating the indication to include the needed capabilities.

10. The method of claim 8, wherein the indication of planned assets is maintained by updating the indication to include changes of assets due to sustaining operations.

11. The method of claim 1, further comprising:
displaying at least the strategy statement, the set of needed capabilities, a description of each of the plurality of solutions, and the rating for each of the plurality of solutions.

12. The method of claim 1, wherein the subset includes one or more of the needed capabilities that may accomplish a similar function or impact a same domain.

13. The method of claim 1, wherein a single solution is selected to be implemented for each of a plurality of subsets of needed capabilities, and wherein the set of needed capabilities is comprised of the plurality of subsets of needed capabilities.

14. The method of claim 1, wherein the business and technology criteria include a measure of the degree of association for business fit, technology fit, and one or more of the agility, risk, initial costs, periodic costs, and readiness of each of the plurality of solutions.

15. The method of claim 14, wherein the rating is displayed as an indication of one of a plurality of states corresponding to varying degrees of association.

16. The method of claim 1, wherein the business and technology criteria include a measure of the degree of association with business goals and technology fit.

17. The method of claim 16, wherein the rating is displayed as an indication on a graph indicating a degree of association with the technology fit criterion versus the degree of association with the business goal criterion.

* * * * *